United States Patent
Kurata et al.

(10) Patent No.: US 6,851,507 B2
(45) Date of Patent: Feb. 8, 2005

(54) POWER STEERING SYSTEM

(75) Inventors: Masakazu Kurata, Yokohama (JP);
Tadaharu Yokota, Kanagawa (JP);
Michiya Hiramoto, Yokohama (JP)

(73) Assignee: Hitachi Unisia Automotive Ltd., Kanagawa (JP)

( * ) Notice: Subject to any disclaimer, the term of this patent is extended or adjusted under 35 U.S.C. 154(b) by 0 days.

(21) Appl. No.: 10/750,898

(22) Filed: Jan. 5, 2004

(65) Prior Publication Data

US 2004/0134709 A1 Jul. 15, 2004

(30) Foreign Application Priority Data

Jan. 9, 2003 (JP) ........................................ 2003-002681

(51) Int. Cl.[7] ................................................ B62D 5/08
(52) U.S. Cl. ...................... 180/422; 180/442; 180/441; 60/476
(58) Field of Search ................................ 180/422, 423, 180/442, 417, 434, 436; 60/473, 476

(56) References Cited

U.S. PATENT DOCUMENTS

| | | | | |
|---|---|---|---|---|
| 3,931,711 A | * | 1/1976 | Rau et al. ..................... 60/445 |
| 5,279,380 A | * | 1/1994 | Frank et al. ................. 180/422 |
| 5,600,955 A | * | 2/1997 | Sahinkaya .................... 60/469 |
| 5,758,739 A | * | 6/1998 | Voss et al. .................. 180/403 |
| 6,092,012 A | * | 7/2000 | Shimizu ....................... 701/41 |
| 6,152,254 A | * | 11/2000 | Phillips ...................... 180/422 |
| 6,260,356 B1 | * | 7/2001 | Baughn et al. ............... 60/431 |
| 2003/0178241 A1 | * | 9/2003 | Yokota et al. .............. 180/441 |

FOREIGN PATENT DOCUMENTS

JP          59-118569 A          7/1984

* cited by examiner

*Primary Examiner*—Avraham Lerner
(74) *Attorney, Agent, or Firm*—Sughrue Mion, PLLC

(57) ABSTRACT

A power steering system includes: a first drain passage for draining an oil pressure from a first oil passage, a second drain passage for draining the oil pressure from a second oil passage, and a pair of a first and second switch valves. When one of the first oil passage and the second oil passage is so pressurized by an operation of a reversible oil pump as to have an increased internal pressure, the pair of the first switch valve and the second switch valve allow the following: i) closing one of the first drain passage and the second drain passage which one is connected to the oil passage having the thus increased internal pressure, while ii) opening the other of the first drain passage and the second drain passage which other is connected to the oil passage that is so depressurized as to have a decreased internal pressure.

15 Claims, 4 Drawing Sheets

POWER STEERING SYSTEM

BACKGROUND OF THE INVENTION

1. Field of the Invention

The present invention relates to a power steering system that can apply a steering force and a steering assistance force by operating an oil pressure cylinder in accordance with an input torque outputted from a steering input mechanism such as a steering wheel of a vehicle.

2. Description of the Related Art

A conventionally known power steering system of this kind is disclosed in Japanese Patent Unexamined Publication No. Showa 59 (1984)-118569 (=JP59-118569).

The above power steering system (referred to as "power steering gear" in its English abstract) includes:

1) a steering shaft mounted to a steering wheel,
2) an output shaft connected to a lower end of the steering shaft,
3) a pinion mounted to a lower end of the output shaft, and a rack meshed with the pinion,
4) an oil pressure cylinder which is an operation oil actuator connected to the rack,
5) a reversible oil pump supplying an operation oil pressure by way of a first oil passage and a second oil passage respectively to a first oil pressure chamber (right) and a second oil pressure chamber (left) which are pairwise and partitioned by a piston of the oil pressure cylinder,
6) an electromagnetic switch valve fitted to a bypass passage connected between the first oil passage and the second oil passage, the electromagnetic switch valve opening and closing the bypass passage.

In the traveling of a vehicle, ordinarily turning the steering wheel clockwise and counterclockwise may allow the following operations:

1) A torque sensor (after detecting a steering torque) may output a passage-closing signal to the electromagnetic switch valve by way of an electric controller.
2) The reversible oil pump may turn forward or reverse, thus supplying the operation oil pressure in the following manner:
   i) Operation oil pressure in one of the first oil pressure chamber (right) and the second oil pressure chamber (left) is supplied to the other of the first oil pressure chamber (right) and the second oil pressure chamber (left).
   ii) Operation oil pressure in one of the first oil passage and the second oil passage is supplied to the other of the first oil passage and the second oil passage.

The operation oil sufficiently supplied to substantially an entire closed circuit including the other of the first oil pressure chamber (right) and the second oil pressure chamber (left) and the other of the first oil passage and the second oil passage may be pressurized by means of the reversible oil pump, thus expanding the other of the first oil passage and the second oil passage or smashing bubble in the operation oil, resulting in an apparent increase in capacity of the other of the first oil passage and the second oil passage. For compensating for the increase in capacity, a reservoir is used for sucking the operation oil by way of a check valve into the other of the first oil passage and the second oil passage for pressurization by means of the reversible oil pump, thus giving the steering assistance force.

Under the Japanese Patent Unexamined Publication No. Showa 59 (1984)-118569 (=JP59-118569) in which the apparent increase in capacity of the other of the first oil passage and the second oil passage is compensated for by the operation oil from the reservoir.

The above compensation may, however, cause variation in operation oil quantity between the first oil passage and the second oil passage. Thereby, changing the turning of the reversible oil pump from forward to reverse such that the operation oil pressure can be supplied to the one of the first oil passage and the second oil passage may cause a remaining pressure due to a speed reduction of the oil pressure of the other of the first oil passage and the second oil passage. Hereinabove, the speed reduction is attributable to the increased operation oil quantity (namely, an increase equivalent to the compensation) of the other of the first oil passage and the second oil passage, which other was so far subjected to the pressurization.

With this, pressurizing the operation oil of the one of the first oil passage and the second oil passage for increased oil pressure thereof cannot make the steering assistance, unless the above pressurization is over the remaining pressure of the other of the first oil passage and the second oil passage. A delay in the steering assistance may thus be caused, rapidly fluctuating torque of the steering wheel, resulting in deteriorated steering feel.

BRIEF SUMMARY OF THE INVENTION

It is an object of the present invention to provide a power steering system which is provided with a first drain passage and a second drain passage for draining an oil pressure from a first oil passage and a second oil passage to a reservoir. When an internal pressure of one of the first oil passage and the second oil passage is increased by an operation of a reversible oil pump, one of the first drain passage and the second drain passage whichever has the increased internal pressure may be closed, while the other of the first drain passage and the second oil passage whichever has a decreased internal pressure may be opened.

According to a first aspect of the present invention, there is provided a power steering system for controlling a steering of a wheel, comprising:

1) an oil pressure cylinder including:
   i) a first oil pressure chamber,
   ii) a second oil pressure chamber, and
   iii) a piston partitioning the oil pressure cylinder into the first oil pressure chamber and the second oil pressure chamber;
2) an oil passage including:
   a first oil passage connected to the first oil pressure chamber, for a supply and a drainage of an oil pressure, and
   a second oil passage connected to the second oil pressure chamber, for the supply and the drainage of the oil pressure;
3) a reversible oil pump, in accordance with an input torque outputted from a steering input mechanism, supplying the oil pressure to one of the first oil pressure chamber and the second oil pressure chamber while draining the oil pressure from the other of the first oil pressure chamber and the second oil pressure chamber, thus controlling the steering of the wheel;
4) a drain passage including:
   i) a first drain passage for draining the oil pressure from the first oil passage, and
   ii) a second drain passage for draining the oil pressure from the second oil passage;

5) a reservoir connected to the first drain passage and the second drain passage, the reservoir reserving the oil pressure drained from the first oil passage and the second oil passage respectively through the first drain passage and the second drain passage; and 6) a switch valve including:
i) a first switch valve connected to the first drain passage, and
ii) a second switch valve connected to the second drain passage (14).

When one of the first oil passage and the second oil passage is so pressurized by an operation of the reversible oil pump as to have an increased internal pressure, a pair of the first switch valve and the second switch valve allow the following:
i) closing one of the first drain passage and the second drain passage which one is connected to the oil passage having the thus increased internal pressure,
while
ii) opening the other of the first drain passage and the second drain passage which other is connected to the oil passage that is so depressurized as to have a decreased internal pressure.

According to a second aspect of the present invention, there is provided an oil pressure circuit for controlling a steering of a wheel, comprising:

1) an oil passage including:
a first oil passage for a supply and a drainage of an oil pressure, and
a second oil passage for the supply and the drainage of the oil pressure;

2) a reversible oil pump connected to the first oil passage and the second oil passage, the reversible oil pump, in accordance with an input torque outputted from a steering input mechanism, supplying the oil pressure to one of a first oil pressure chamber and a second oil pressure chamber while draining the oil pressure from the other of the first oil pressure chamber and the second oil pressure chamber, thus controlling the steering of the wheel;

3) a drain passage including:
i) a first drain passage for draining the oil pressure from the first oil passage, and
ii) a second drain passage for draining the oil pressure from the second oil passage;

4) a reservoir connected to the first drain passage and the second drain passage, the reservoir reserving the oil pressure drained from the first oil passage and the second oil passage respectively through the first drain passage and the second drain passage; and 5) a switch valve including:
i) a first switch valve connected to the first drain passage, and
ii) a second switch valve connected to the second drain passage, When one of the first oil passage and the second oil passage is so pressurized by an operation of the reversible oil pump as to have an increased internal pressure, a pair of the first switch valve and the second switch valve allow the following:
i) closing one of the first drain passage and the second drain passage which one is connected to the oil passage having the thus increased internal pressure,
while
ii) opening the other of the first drain passage and the second drain passage which other is connected to the oil passage that is so depressurized as to have a decreased internal pressure.

The other object(s) and feature(s) of the present invention will become understood from the following description with reference to the accompanying drawings.

DETAILED DESCRIPTION OF THE EMBODIMENT

In the following, various embodiments of the present invention will be described in detail with reference to the accompanying drawings.

For ease of understanding, the following description will contain various directional terms, such as, left, right, upper, lower, forward, rearward and the like. However, such terms are to be understood with respect to only a drawing or drawings on which the corresponding part of element is illustrated.

<Constitution—First Embodiment>

Figure 1:
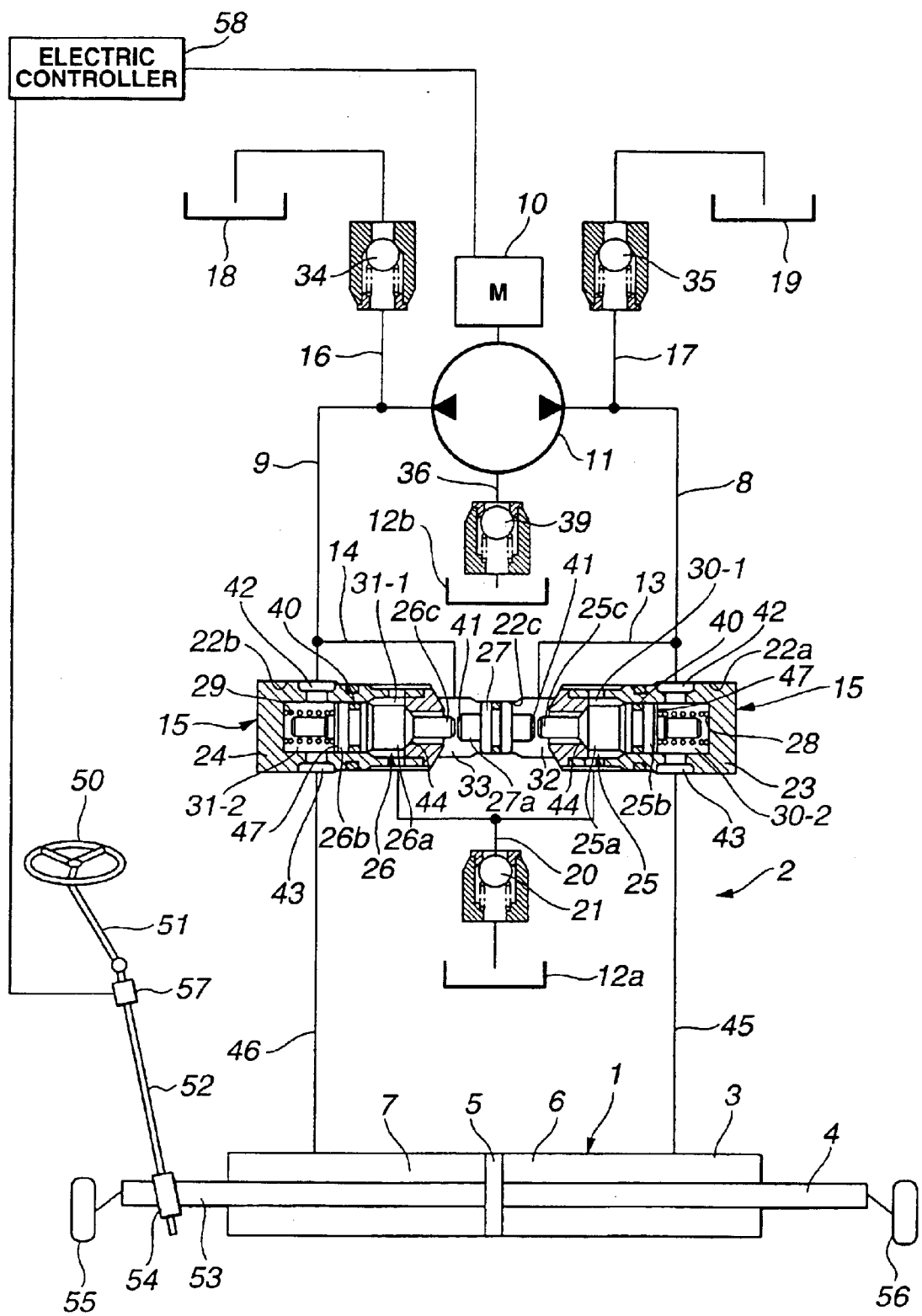
FIG. 1 shows a schematic overall view including an oil pressure cylinder 1 and an oil pressure circuit 2 of a power steering system, according to a first embodiment of the present invention.

FIG. 1 shows principally an oil pressure cylinder 1 and an oil pressure circuit 2 of a power steering system, according to a first embodiment of the present invention. Schematically, the power steering system has a steering wheel 50, an input shaft 51, an output shaft 52, a rack 53, a pinion 54, front right and left wheels 55, 56, a torque sensor 57, oil pressure cylinder 1 connecting to rack 53, and oil pressure circuit 2. Hereinabove, steering wheel 50 works as a steering input mechanism. Rack 53 and pinion 54 are mounted on a lower end side of output shaft 52. Torque sensor 57 mounted on an upper end side of output shaft 52 can detect information on a steering torque of steering wheel 50 and on an input (road surface) from front right and left wheels 55, 56. Oil pressure circuit 2 may supply an operation oil pressure to oil pressure cylinder 1 and drain the operation oil pressure from oil pressure cylinder 1.

Oil pressure cylinder 1 has a barrel cylinder section 3 extending in a widthwise direction of a vehicular body. A piston rod 4 connected to rack 53 is inserted through barrel cylinder section 3 of oil pressure cylinder 1. A piston 5 sliding in barrel cylinder section 3 is fixed to piston rod 4. In barrel cylinder section 3, piston 5 partitions oil pressure cylinder 1 (or barrel cylinder section 3) into a first oil pressure chamber 6 (right in FIG. 1) and a second oil pressure chamber 7 (left in FIG. 1).

Oil pressure circuit 2 includes:
1) a pair of a first oil passage 8 and a second oil passage 9 each of which has a first end (lower in FIG. 1) connected, respectively, to first oil pressure chamber 6 and second oil pressure chamber 7, 2) a reversible oil pump 11 (one in number) connected to a second end (upper in FIG. 1) of each of first oil passage 8 and second oil passage 9, and capable of making a reversible rotation (making both forward and reverse rotations) by means of a pump motor 10.

3) a first drain passage 13 and a second drain passage 14 connected, respectively, to a way of first oil passage 8 and second oil passage 9, and each of first drain passage 13 and second drain passage 14 having a downstream end connecting to a primary reservoir 12a (referred to as "reservoir" in WHAT IS CLAIMED IS).

4) a switch valve 15 disposed between first drain passage 13 and second drain passage 14, and switching connection of first drain passage 13 and second drain passage 14 with primary reservoir 12a by allowing first drain passage 13 and second drain passage 14 to open and close relative to each other in accordance with a differential oil pressure between first oil passage 8 and second oil passage 9, and 5) a second reservoir 19 and a first reservoir 18 for supplying a relative operation oil to first oil passage 8 and second oil passage 9, respectively, by way of a second compensator passage 17 and a first compensator passage 16.

Based on a detecting signal outputted from torque sensor 57, pump motor 10 can turn (forward and reverse) and stop reversible oil pump 11 with a control current from an electric controller 58. Electric controller 58 receives the detecting signal from torque sensor 57.

Each of first drain passage 13 and second drain passage 14 has the downstream end connected to a drain passage 20 connecting to primary reservoir 12a. Drain passage 20 is fitted with a check valve 21 for allowing entry of the operation oil from each of first oil passage 8 and second oil passage 9 only into primary reservoir 12a.

Drain passage 20 connecting first chambers 30-1, 31-1 (to be described afterward) together on an upstream side of primary reservoir 12a can bring about the following effect:

The operation oil drained from one of first chamber 30-1 and first chamber 31-1 can be supplied directly to the other of first chamber 30-1 and first chamber 31-1, leaving no need of sucking the operation oil from primary reservoir 12a by means of the other of first chamber 30-1 and first chamber 31-1, resulting in a preferred communication of the operation oil between first chamber 30-1 (right in FIG. 1) and first chamber 31-1 (left in FIG. 1). This may contribute to improved feel of steering wheel 50 when reversible oil pump 11 is free from its operation.

In second chambers 30-2, 31-2 (back pressure chambers—to be described afterward), there are defined first openings 42, 42 connecting respectively to first oil passage 8 and second oil passage 9 on reversible oil pump 11's side, while there are defined second openings 43, 43 connecting respectively to oil passages 45, 46 on oil pressure cylinder 1's side, thus eliminating the need for forming additional divisional oil passages (which may extend otherwise from first oil passage 8 and second oil passage 9 for supplying the oil pressure to respective second chambers 30-2, 31-2), resulting in simplified constitution of the power steering system.

Switch valve 15 includes:

1) a pair of a first valve hole 22a and a second valve hole 22b crossing respectively first oil passage 8 and second oil passage 9, and formed in line with each other in such a manner as to connect with each other in substantially a center section that connects with first drain passage 13 and second drain passage 14, 2) a first valve body 23 and a second valve body 24 fixed to an internal wall of first valve hole 22a and second valve hole 22b respectively, and shaped substantially into a based barrel, 3) a pair of a first poppet valve body 25 and a second poppet valve body 26 for allowing first drain passage 13 and second drain passage 14 to open and close relative to each other in accordance with the differential oil pressure between first oil passage 8 and second oil passage 9, and 4) a free piston 27 which:
is disposed in a sliding hole 22c (referred to as "connection passage" in WHAT IS CLAIMED IS) connecting first valve hole 22a with second valve hole 22b substantially in the center section,
is adapted to slide substantially axially toward first poppet valve body 25 and second poppet valve body 26, and
controls a relative operational position between first poppet valve body 25 and second poppet valve body 26.

First poppet valve body 25 is slidably received in first valve hole 22a and is provided with a seal section 40 for partitioning first valve hole 22a into first chamber 30-1 and second chamber 30-2, while second poppet valve body 26 is slidably received in second valve hole 22b and is provided with a seal section 40 for partitioning second valve hole 22b into first chamber 31-1 and second chamber 31-2.

First chamber 30-1, 31-1 connects to oil passage 8, 9 by way of drain passage 13, 14 and connects to primary reservoir 12a by way of drain passage 20, such that opening and closing poppet valve body 25, 26 can make a switching control of a connection and a disconnection between oil passage 8, 9 and primary reservoir 12a.

Second chamber 30-2, 31-2 connects to oil passage 8, 9, and second chamber 30-2, 31-2's side of poppet valve body 25, 26 is provided with a pressure applied face 47, 47 for allowing the oil pressure from reversible oil pump 11 to bias poppet valve body 25, 26 to first chamber 30-1, 31-1.

Seal section 40 (right in FIG. 1) making the partition into first chamber 30-1 and second chamber 30-2 can assuredly disconnect first oil passage 8 from primary reservoir 12a by means of a differential oil pressure which may be caused between a forward section of first poppet valve body 25 and a back section of first poppet valve body 25. Likewise, seal section 40 (left in FIG. 1) making the partition into first chamber 31-1 and second chamber 31-2 can assuredly disconnect the second oil passage 9 from primary reservoir 12a by means of a differential oil pressure which may be caused between a forward section of second poppet valve body 26 and a back section of second poppet valve body 26.

Free piston 27 is provided with an abutment section 41 for pushing poppet valve body 25, 26 to open the poppet valve body 25, 26.

Abutment section 41 can directly push first poppet valve body 25 and second poppet valve body 26, thus opening first poppet valve body 25 and second poppet valve body 26 more assuredly than without abutment section 41 (namely, pushing only by the oil pressure).

Principally, first poppet valve body 25 and second poppet valve body 26, respectively, include:

1) a valve section 25a and a valve section 26a which are disposed, respectively, in first valve body 23 and second valve body 24 in such a manner as to form a line, and which are shaped substantially into a cylinder formed with a step, and 2) a back end section 25b and a back end section 26b having such a large diameter as to receive the operation oil pressure from first oil passage 8 and second oil passage 9 through a second chamber 30-2 and a second chamber 31-2 which are respectively disposed at a base (right in FIG. 1) of first valve body 23 and a base (left in FIG. 1) of second valve body 24.

Moreover, valve section 25a has at a head end (left in FIG. 1) thereof a switching section 44 which is shaped substantially into a cone frustum and is integrated with an abutment shaft 25c adapted to abut on a first side (right in FIG. 1) of a center shaft 27a of free piston 27, while valve section 26a has at a head end (right in FIG. 1, and opposed to the head end of valve section 25a) thereof a switching section 44 which is shaped substantially into a cone frustum and is integrated with an abutment shaft 26c adapted to abut on a second side (left in FIG. 1) of center shaft 27a of free piston 27.

First poppet valve body 25 is biased to free piston 27 by means of a spring force of a coil spring 28 (referred to as "resilient member" in WHAT IS CLAIMED IS) which is resiliently disposed between the base (right in FIG. 1) of first valve body 23 and back end portion 25b, while second poppet valve body 26 is biased to free piston 27 by means of a spring force of a coil spring 29 (referred to as "resilient member" in WHAT IS CLAIMED IS) which is resiliently disposed between the base (left in FIG. 1) of second valve body 24 and the back end portion 26b, thus keeping substantially a neutral position when reversible oil pump 11 is free from its operation. In the above state, each of valve section 25a and valve section 26a can be seated on a seat face at a head end of first valve body 23 and second valve body 24, thus closing first drain passage 13 and second drain passage 14, in other words, causing what is called a continuously closed state.

A pressure chamber 32 and a pressure chamber 33 are formed, respectively, on a way of first drain passage 13 and a way of second drain passage 14. With the differential oil pressure between first oil passage 8 and second oil passage 9 (namely, a differential oil pressure between a pressure chamber 32 and a pressure chamber 33) applied to free piston 27, free piston 27 can slide rightward or leftward in FIG. 1, thus sliding switchably one of first poppet valve body 25 and second poppet valve body 26 against the spring force of respective coil spring 28 and coil spring 29.

On a way of second compensator passage 17, there is provided a second check valve 35 for allowing entry of the operation oil from second reservoir 19 only into first oil passage 8; while on a way of first compensator passage 16, there is provided a first check valve 34 for allowing entry of the operation oil from first reservoir 18 only into second oil passage 9.

Reversible oil pump 11 has an intake passage 36 which is fitted with a check valve 39 for allowing entry of the operation oil from a secondary reservoir 12b only into reversible oil pump 11.

<Operation—First Embodiment>

Described hereinafter is operation of the power steering system, according to the first embodiment of the present invention.

A driver keeping a neutral state of steering wheel 50 with his/her vehicle making substantially a straight traveling may not convey an output of a control current from electric controller 58 to pump motor 10, thus making reversible oil pump 11 free from its operation. In the above state, as is seen in FIG. 1, the differential oil pressure is not expected to be caused between first oil passage 8 and second oil passage 9, thereby allowing first poppet valve body 25 and second poppet valve body 26 to keep the neutral position by means of the spring force of coil spring 28 and coil spring 29 via free piston 27. Thereby, valve section 25a and valve section 26a seated on respective seats may keep closing first drain passage 13 and second drain passage 14 respectively.

Turning, for example, clockwise steering wheel 50 thereafter may allow the control current from electric controller 58 to turn reversible oil pump 11, for example, in a forward direction, via pump motor 10. The above operation of reversible oil pump 11 may pump the operation oil of second oil passage 9 to be discharged into first oil passage 8, as is seen FIG. 2. Then, most of the operation oil in first oil passage 8 may enter first oil pressure chamber 6 by way of second chamber 30-2, while a part of the operation oil in first oil passage 8 may enter pressure chamber 32 by way of first drain passage 13. Substantially simultaneously with the above, the operation oil in first reservoir 18 may enter first oil passage 8 and first oil pressure chamber 6 by way of reversible oil pump 11, thus compensating shortage.

With this, an internal pressure of pressure chamber 32 may be increased, while an internal pressure of pressure chamber 33 may be decreased. As is seen in FIG. 2, free piston 27 may thereby slide to second poppet valve body 26 (left in FIG. 2), thus allowing second poppet valve body 26 to be retreated to second chamber 31-2 and then to be spaced apart from first poppet valve body 25 against the spring force of coil spring 29.

Figure 2:
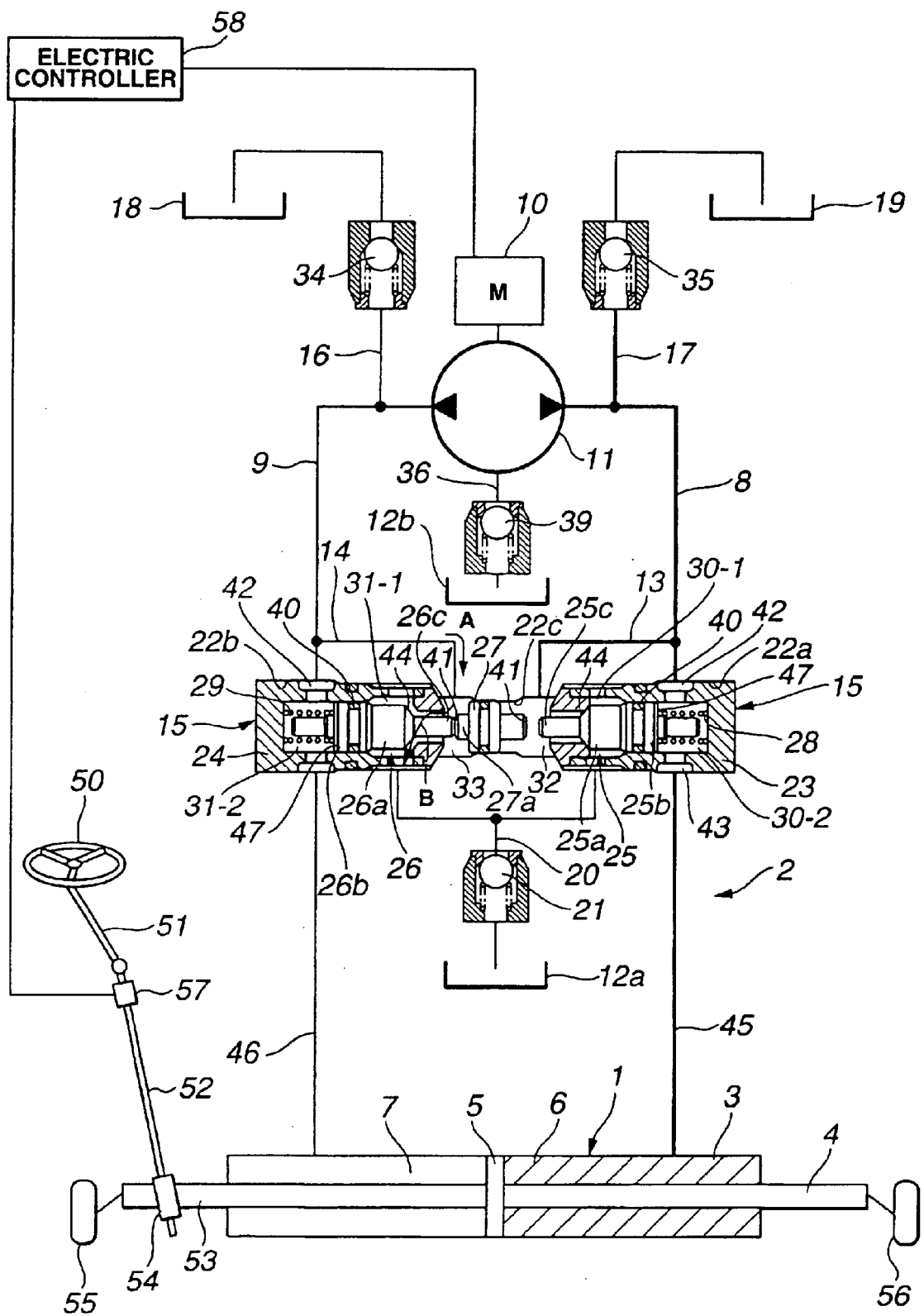
FIG. 2 shows a first operation of the power steering system, according to the first embodiment.

After the above operation, first drain passage 13 may be kept closed, while pressure chamber 33's side of second drain passage 14 may be opened, thus allowing a part of the operation oil pressure in second oil passage 9 to be promptly drained into primary reservoir 12a by way of check valve 21, as is indicated by an arrow A and an arrow B in FIG. 2. The decrease in the operation oil pressure in second oil passage 9 may thereby be accelerated, thus preventing occurrence of a remaining pressure.

Contrary to the above, changing the turning of steering wheel 50 from the clockwise state to the original state and further to a counterclockwise state may allow electric controller 58 to reverse reversible oil pump 11 by way of pump motor 10.

Figure 3:
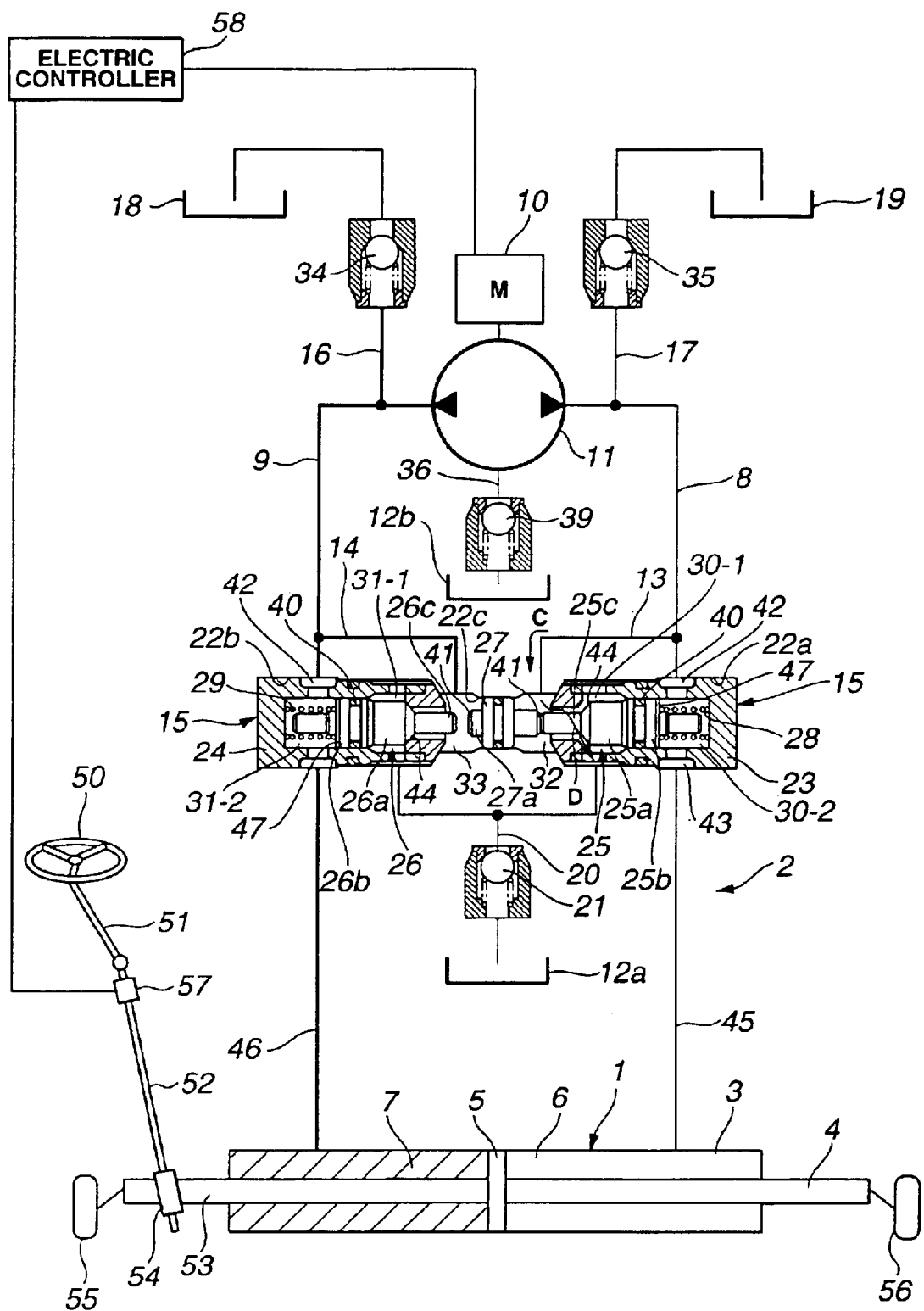
FIG. 3 shows a second operation of the power steering system, according to the first embodiment.

In this case, as is seen in FIG. 3, the operation oil in first oil passage 8 and second reservoir 19 may be discharged into second oil passage 9, to be supplied thereafter to second oil pressure chamber 7 by way of second chamber 31-2.

With this, the internal pressure of pressure chamber 32 may be decreased, while the internal pressure of pressure chamber 33 may be increased. As is seen in FIG. 3, free piston 27 may thereby slide to first poppet valve body 25 (right in FIG. 2), thus allowing first poppet valve body 25 to be retreated to second chamber 30-2 and then be spaced apart from second poppet valve body 26 against the spring force of coil spring 28.

After the above operation, second drain passage 14 may be kept closed, while pressure chamber 32's side of first drain passage 13 may be opened, thus allowing a part of the operation oil pressure in first oil passage 8 to be promptly drained into primary reservoir 12a by way of check valve 21, as is indicated by an arrow C and an arrow D in FIG. 3. The decrease in the operation oil pressure in first oil passage 8 may be accelerated, thus preventing the occurrence of the remaining pressure.

Summarizing the above, turning steering wheel 50 clockwise or counterclockwise may promptly decrease the internal pressure of one of first oil passage 8 and second oil passage 9 whichever has the decreased pressure (namely, lower pressure), thus prompting a steering assistance of steering wheel 50 and preventing thereby a sudden torque fluctuation of steering wheel 50, resulting in a preferred steering wheel 50.

The operation of first poppet valve body 25 and second poppet valve body 26 are so made as to be controlled by the differential oil pressure between first oil passage 8 and second oil passage 9, namely, by the differential oil pressure between pressure chamber 32 and pressure chamber 33, thus achieving a simpler control than that achieved by an electric means such as an electromagnetic switch valve (not shown). Moreover, the above constitution according to the first embodiment is mechanically simple, thus facilitating production and contributing to reduced cost.

Coil spring 28 and coil spring 29 may bring about the following effect (to be described only about coil spring 28):

With first poppet valve body 25 free from the oil pressure, coil spring 28 can define a position of first poppet valve body 25 in first valve hole 22a, thereby allowing a continuously open state or a continuously closed state of switch valve 15. Moreover, even if the oil pressure applied to the forward section and the back section of first popper valve body 25 is comparatively low, coil spring 28 can bias first poppet valve body 25 to first chamber 30-1, thus assuredly disconnecting first oil passage 8 from primary reservoir 12a.

Free piston 27 disconnecting the oil pressure between first valve hole 22a and second valve hole 22b can prevent the oil pressure on the high pressure side from leaking to the low pressure side, thus assuredly opening one of first poppet valve body 25 and second poppet valve body 26 whichever is on the low pressure side.

The switching section 44 at the head end of each of valve section 25a and valve section 26a of the pair of respective first poppet valve body 25 and second poppet valve body 26 is shaped substantially into the cone frustum, preventing entry of a contamination (including foreign matter) and thereby preventing valve section 25a and valve section 26a from being locked.

In addition, both of first drain passage 13 and second drain passage 14 closed with reversible oil pump 11 free from its operation can prevent leak of the oil pressure (high pressure side) into primary reservoir 12a, thus preventing decrease in steering response.

<Constitution—Second Embodiment>

Figure 4:
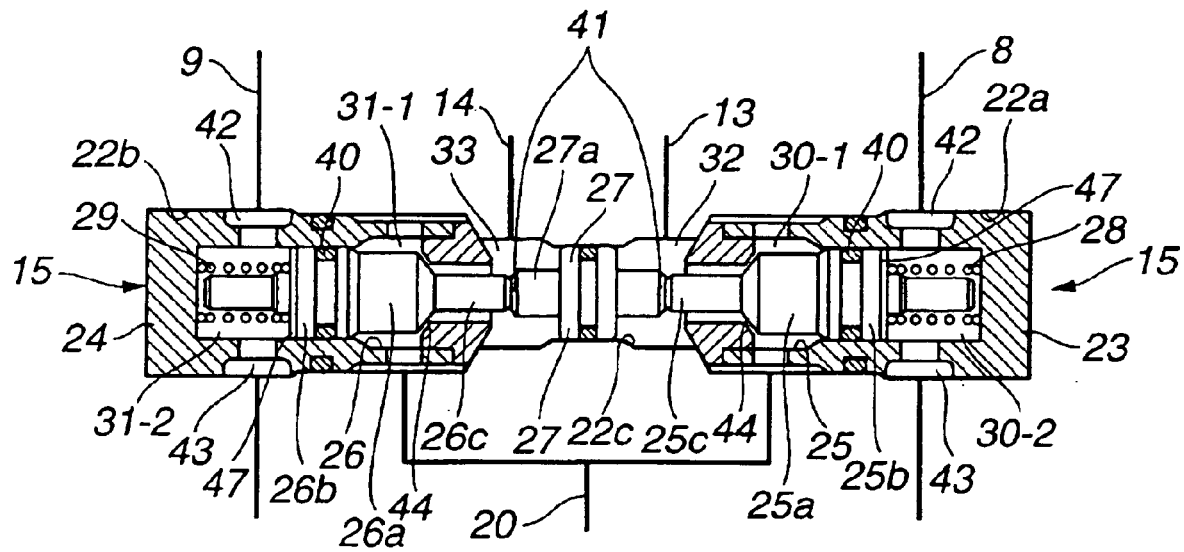
FIG. 4 shows a longitudinal cross section including a switch valve 15, according to a second embodiment of the present invention.

FIG. 4 shows principally switch valve 15 having a constitution of what is called a continuously open type, according to a second embodiment of the present invention.

More specifically about this: elongating to a certain extent an axial length of center shaft 27a of free piston 27 can move first poppet valve body 25 slightly to second chamber 30-2 and second poppet valve body 26 slightly to second chamber 31-2.

Turning steering wheel 50 clockwise or counterclockwise with the above constitution may cause the following operation, like the operation according to the first embodiment:

With the differential oil pressure between first oil passage 8 and second oil passage 9 applied to free piston 27, free piston 27 can slide rightward or leftward in FIG. 4, thus sliding switchably one of first poppet valve body 25 and second poppet valve body 26 for opening one of respective first drain passage 13 and second drain passage 14 with a view to preventing the remaining pressure.

According to the second embodiment, allowing steering wheel 50 in the neutral state (namely, free from the turning) may keep free piston 27 in the neutral position symmetrically. With this, valve section 25a and valve section 26a may be spaced part from respective seat faces, thus opening first drain passage 13 and the second drain passage respectively, resulting in a secured connection between first drain passage 13 and second drain passage 14 with each other.

<Operation—Second Embodiment>

With abutment section 41 abutting both on first poppet valve body 25 and second poppet valve body 26 with reversible oil pump 11 free from its operation, free piston 27 moved by the oil pressure may immediately open one of first poppet valve body 25 and second poppet valve body 26, resulting in improved response of first poppet valve body 25 and second poppet valve body 26. Moreover, allowing free piston 27 to be disposed substantially in the center section with reversible oil pump 11 free from its operation, abutment section 41 abutting both on first poppet valve body 25 and second poppet valve body 26 can prevent deviation of free piston 27, thus achieving substantially a symmetrical steering response.

<Constitution—Third Embodiment>

Figure 5:
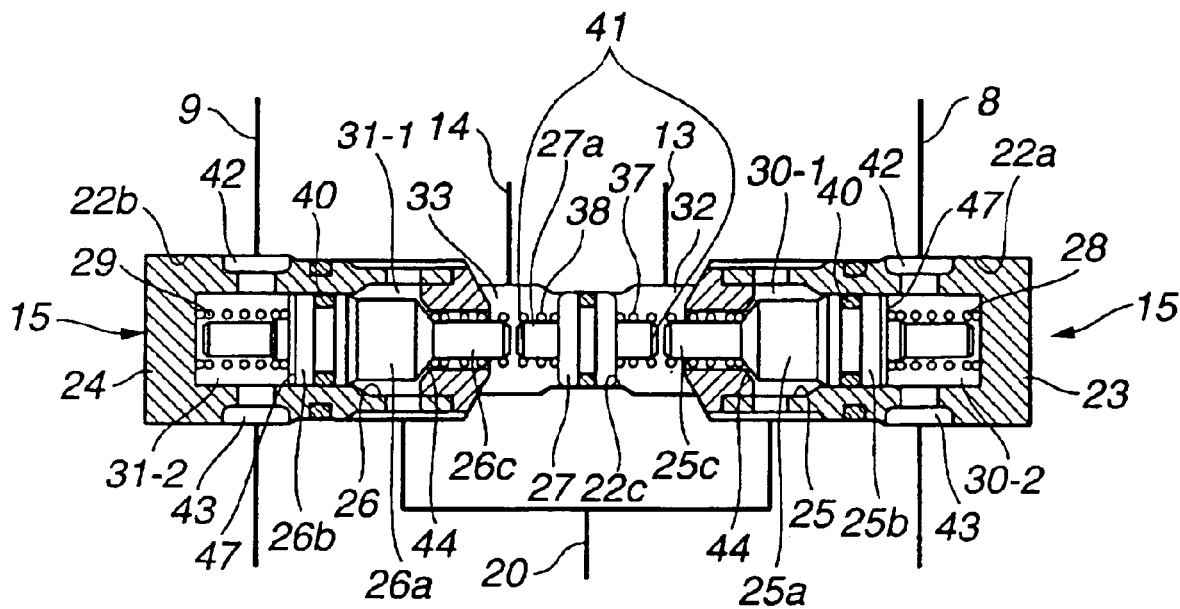
FIG. 5 shows a longitudinal cross section including the switch valve 15, according to a third embodiment of the present invention.

FIG. 5 shows principally switch valve 15 having a constitution of what is called the continuously open type, according to a third embodiment of the present invention. More specifically, the switch calve 15 according to the third embodiment is based on switch valve 15 according to the second embodiment, however, with a coil spring 37 (referred to as "resilient member" in WHAT IS CLAIMED IS) resiliently disposed between a first side face (right in FIG. 5) of free piston 27 and first poppet valve body 25 and a coil spring 38 (referred to as "resilient member" in WHAT IS CLAIMED IS) resiliently disposed between a second side face (left in FIG. 5) of free piston 27 and second poppet valve body 26.

According to the third embodiment, first poppet valve body 25 and second poppet valve body 26 can be forcibly kept in the neutral position by means of the following opposed biasing forces:

The spring force of coil spring 37 opposed to the spring force of coil spring 28, and the spring force of coil spring 38 opposed to the spring force of coil spring 29.

With the constitution of switch valve 15 according to the third embodiment, first drain passage 13 and second drain passage 14 can be kept forcibly open when reversible oil pump 11 is free from its operation, thus securing a manual steering when reversible oil pump 11 is locked and achieving failsafe.

<Operation—Third Embodiment>

Allowing free piston 27 to be disposed substantially in the center section with reversible oil pump 11 free from its operation, coil spring 37 and coil spring 38 can prevent the deviation of free piston 27, thus achieving substantially the symmetrical steering response.

<Operation—Second Embodiment and Third Embodiment>

Switch valve 15 opening both of first drain passage 13 and second drain passage 14 with reversible oil pump 11 free from its operation (namely, the vehicle traveling substantially straightly) according to the second embodiment and the third embodiment can bring about the following operation:

First oil pressure chamber 6 and second oil pressure chamber 7 may have the oil pressure substantially equal to the oil pressure in primary reservoir 12a, bringing about a natural steering feel. Moreover, in this state, first oil passage 8 and second oil passage 9 can be substantially completely free from the remaining pressure, thus preventing steering wheel 50 from being biased clockwise or counterclockwise.

Although the present invention has been described above by reference to three embodiments, the present invention is not limited to the three embodiments described above. Modifications and variations of the embodiment described above will occur to those skilled in the art, in light of the above teachings.

More specifically, free piston 27 can be replaced with the following constitutions:

1) Varying back end section 25b's area for receiving the internal pressure of second chamber 30-2 and back end section 26b's area for receiving the internal pressure of second chamber 31-2.

2) Varying valve section 25a's area for receiving the internal pressure of pressure chamber 32 and valve section 26a's area for receiving the internal pressure of pressure chamber 33.

A differential oil pressure caused by the above constitutions may directly move the first poppet valve body 25 and the second poppet valve body 26.

Moreover, for driving pump motor 10, information {obtained by way of rack-and-pinion 53, 54} on turning angle of steering wheel 50 and on steering angle of front right and left wheels 55, 56 can replace the information on the steering torque of steering wheel 50 and on the input (road surface) from front right and left wheels 55, 56.

Still furthermore, as the steering input mechanism, an electric means including a joy stick and the like can replace steering wheel 50.

This application is based on a prior Japanese Patent Application No. P2003-002681 (filed on Jan. 9, 2003 in Japan). The entire contents of the Japanese Patent Application No. P2003-002681 from which priority is claimed is incorporated herein by reference, in order to take some protection against mis-translation or omitted portions.

The scope of the present invention is defined with reference to the following claims.

What is claimed is:

1. A power steering system for controlling a steering of a wheel, comprising:
    a) an oil pressure cylinder including:
        i) a first oil pressure chamber,
        ii) a second oil pressure chamber, and
        iii) a piston partitioning the oil pressure cylinder into the first oil pressure chamber and the second oil pressure chamber;
    b) an oil passage including:
        a first oil passage connected to the first oil pressure chamber, for a supply and a drainage of an oil pressure, and
        a second oil passage connected to the second oil pressure chamber, for the supply and the drainage of the oil pressure;
    c) a reversible oil pump, in accordance with an input torque outputted from a steering input mechanism, supplying the oil pressure to one of the first oil pressure chamber and the second oil pressure chamber while draining the oil pressure from the other of the first oil pressure chamber and the second oil pressure chamber, thus controlling the steering of the wheel;
    d) a drain passage including:
        i) a first drain passage for draining the oil pressure from the first oil passage, and
        ii) a second drain passage for draining the oil pressure from the second oil passage;
    e) a reservoir connected to the first drain passage and the second drain passage, the reservoir reserving the oil pressure drained from the first oil passage and the second oil passage respectively through the first drain passage and the second drain passage; and
    f) a switch valve including:
        i) a first switch valve connected to the first drain passage, and
        ii) a second switch valve connected to the second drain passage, when one of the first oil passage and the second oil passage is so pressurized by an operation of the reversible oil pump as to have an increased internal pressure, a pair of the first switch valve and the second switch valve allowing the following:
        i) closing one of the first drain passage and the second drain passage which one is connected to the oil passage having the thus increased internal pressure, while
        ii) opening the other of the first drain passage and the second drain passage which other is connected to the oil passage that is so depressurized as to have a decreased internal pressure.

2. The power steering system as claimed in claim 1, wherein
    the switch valve is so disposed between the first drain passage and the second drain passage as to allow the first drain passage and the second drain passage to open and close relative to each other in accordance with a differential oil pressure between the first oil passage and the second oil passage.

3. The power steering system as claimed in claim 2, wherein
    the first switch valve includes:
        a first poppet valve body for opening and closing the first drain passage, and
    the second switch valve includes:
        a second poppet valve body for opening and closing the second drain passage.

4. The power steering system as claimed in claim 3, wherein
    the first poppet valve body is slidably received in a first valve hole and is provided with a seal section for partitioning the first valve hole into a first chamber and a second chamber, while the second poppet valve body is slidably received in a second valve hole and is provided with a seal section for partitioning the second valve hole into a first chamber and a second chamber,
    the first chamber connects to the oil passage by way of the drain passage and connects to the reservoir by way of a drain passage, such that opening and closing the poppet valve body make a switching control of a connection and a disconnection between the oil passage and the reservoir, and
    the second chamber connects to the oil passage, and the second chamber's side of the poppet valve body is provided with a pressure applied face for allowing the oil pressure from the reversible oil pump to bias the poppet valve body to the first chamber.

5. The power steering system as claimed in claim 4, wherein
    each of the first poppet valve body and the second poppet valve body is provided with a resilient member for biasing the poppet valve body to the first chamber.

6. The power steering system as claimed in claim 5, wherein
    the power steering system further includes:
        a connection passage for connecting the first chamber of the first valve hole with the first chamber of the second valve hole, and
        a free piston slidably disposed in the connection passage, and
    the free piston moves substantially axially in accordance with the differential oil pressure between the first oil passage and the second oil passage, thus opening and closing the first poppet valve body and the second poppet valve body relative to each other.

7. The power steering system as claimed in claim 6, wherein
the free piston is provided with an abutment section for pushing the poppet valve body to open the poppet valve body.

8. The power steering system as claimed in claim 7, wherein
the abutment section abuts on the first poppet valve body and the second poppet valve body when the reversible oil pump is free from the operation.

9. The power steering system as claimed in claim 7, further comprising:
a resilient member between the free piston and the first poppet valve body, and
a resilient member between the free piston and the second poppet valve body.

10. The power steering system as claimed in claim 4, wherein
each of the first poppet valve body and the second poppet valve body has a switching section for making the switching control of the connection and the disconnection between the oil passage and the reservoir, the switching section being shaped substantially into a cone frustum.

11. The power steering system as claimed in claim 4, wherein
the drain passage connects the first chambers with the reservoir, and
on an upstream side of the reservoir, the drain passage connects the first chamber of the first poppet valve body to the first chamber of the second poppet valve body.

12. The power steering system as claimed in claim 4, wherein
the second chamber is formed with a pair of a first opening and a second opening,
the first opening connects to the oil passage on the reversible oil pump's side, while the second opening connects to an oil passage on the oil pressure cylinder's side.

13. The power steering system as claimed in claim 1, wherein
the switch valve opens the first drain passage and the second drain passage when the reversible oil pump is free from the operation.

14. The power steering system as claimed in claim 1, wherein
the switch valve closes the first drain passage and the second drain passage when the reversible oil pump is free from the operation.

15. An oil pressure circuit for controlling a steering of a wheel, comprising:
a) an oil passage including:
a first oil passage for a supply and a drainage of an oil pressure, and
a second oil passage for the supply and the drainage of the oil pressure;
b) a reversible oil pump connected to the first oil passage and the second oil passage, the reversible oil pump, in accordance with an input torque outputted from a steering input mechanism, supplying the oil pressure to one of a first oil pressure chamber and a second oil pressure chamber while draining the oil pressure from the other of the first oil pressure chamber and the second oil pressure chamber, thus controlling the steering of the wheel;
c) a drain passage including:
i) a first drain passage for draining the oil pressure from the first oil passage, and
ii) a second drain passage for draining the oil pressure from the second oil passage;
d) a reservoir connected to the first drain passage and the second drain passage, the reservoir reserving the oil pressure drained from the first oil passage and the second oil passage respectively through the first drain passage and the second drain passage; and
e) a switch valve including:
i) a first switch valve connected to the first drain passage, and
ii) a second switch valve connected to the second drain passage,
when one of the first oil passage and the second oil passage is so pressurized by an operation of the reversible oil pump as to have an increased internal pressure, a pair of the first switch valve and the second switch valve allowing the following:
i) closing one of the first drain passage and the second drain passage which one is connected to the oil passage having the thus increased internal pressure, while
ii) opening the other of the first drain passage and the second drain passage which other is connected to the oil passage that is so depressurized as to have a decreased internal pressure.

\* \* \* \* \*